United States Patent
Sundaresan et al.

(10) Patent No.: US 12,348,307 B1
(45) Date of Patent: Jul. 1, 2025

(54) SYSTEMS AND METHODS FOR PROFILE MANAGEMENT

(71) Applicant: CABLE TELEVISION LABORATORIES, INC., Louisville, CO (US)

(72) Inventors: Karthik Sundaresan, Boulder, CO (US); Gregory Charles White, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/123,882

(22) Filed: Mar. 20, 2023

Related U.S. Application Data

(60) Division of application No. 17/195,266, filed on Mar. 8, 2021, now Pat. No. 11,611,406, which is a continuation of application No. 15/729,058, filed on Oct. 10, 2017, now Pat. No. 10,944,500.

(60) Provisional application No. 62/405,640, filed on Oct. 7, 2016.

(51) Int. Cl.
| | |
|---|---|
| *H04L 1/00* | (2006.01) |
| *H04L 5/00* | (2006.01) |
| *H04L 43/045* | (2022.01) |
| *H04L 43/08* | (2022.01) |
| *H04B 1/38* | (2015.01) |

(52) U.S. Cl.
CPC .......... *H04L 1/0003* (2013.01); *H04L 1/0009* (2013.01); *H04L 1/0019* (2013.01); *H04L 5/0007* (2013.01); *H04L 5/0046* (2013.01); *H04L 5/006* (2013.01); *H04L 43/045* (2013.01); *H04L 43/08* (2013.01); *H04B 1/38* (2013.01); *H04L 5/001* (2013.01)

(58) Field of Classification Search
CPC ... H04L 1/0003; H04L 1/0009; H04L 1/0019; H04L 5/0007; H04L 5/0046; H04L 5/006; H04L 43/045; H04L 43/08; H04B 1/38
USPC .......................................... 370/252
See application file for complete search history.

(56) References Cited

U.S. PATENT DOCUMENTS

| | | | |
|---|---|---|---|
| 6,871,073 | B1 | 3/2005 | Boyer et al. |
| 2002/0120105 | A1 | 8/2002 | Myerson et al. |
| 2003/0033425 | A1 | 2/2003 | Deshpande |
| 2005/0120105 | A1 | 6/2005 | Popescu et al. |
| 2005/0149473 | A1* | 7/2005 | Weare .................... G06Q 10/10 |
| 2007/0111667 | A1* | 5/2007 | Kwon ................. H04L 25/0226 |
| | | | 455/67.11 |

(Continued)

*Primary Examiner* — Chi Tang P Cheng
(74) *Attorney, Agent, or Firm* — Josh C. Snider; Snider IP

(57) ABSTRACT

A profile optimizing method is provided for a downstream channel transmission of active subcarriers to user devices. The method includes steps of receiving channel measurement data from each user device for each subcarrier, calculating a maximum bit-loading value for each user device per subcarrier, grouping the user devices into a plurality of clusters based on a proximity of the maximum bit-loading values of a first user device to those of a second user device within the particular cluster, assigning each user device within the particular cluster to a single cluster profile. A plurality of single cluster profiles for the plurality of clusters forms a set of cluster profiles. The method further includes steps of determining a channel capacity ratio for the set of cluster profiles, and combining at least two single profiles of the set of cluster profiles into a coalesced profile pair.

19 Claims, 7 Drawing Sheets

(56) References Cited

U.S. PATENT DOCUMENTS

| | | | |
|---|---|---|---|
| 2009/0067528 A1* | 3/2009 | Loh | H04L 1/0625 |
| | | | 375/267 |
| 2012/0311496 A1 | 12/2012 | Cao et al. | |
| 2013/0041990 A1* | 2/2013 | Thibeault | H04L 12/2872 |
| | | | 709/223 |
| 2014/0022926 A1* | 1/2014 | Ling | H04L 1/0009 |
| | | | 370/252 |
| 2015/0188668 A1 | 7/2015 | Al-Banna | |
| 2016/0353456 A1 | 12/2016 | Gilson et al. | |
| 2017/0111916 A1 | 4/2017 | Corroy et al. | |

* cited by examiner

SYSTEMS AND METHODS FOR PROFILE MANAGEMENT

CROSS REFERENCE TO RELATED APPLICATIONS

This application is a divisional of U.S. application Ser. No. 17/195,266, filed Mar. 8, 2021, which application is a continuation of U.S. application Ser. No. 15/729,058, filed on Oct. 10, 2017. U.S. application Ser. No. 15/729,058 claims the benefit of and priority to U.S. Provisional Patent Application Ser. No. 62/405,640, filed Oct. 7, 2016. All of these prior applications are incorporated herein by reference in their entireties.

BACKGROUND

The field of the disclosure relates generally to digital transmission systems, and more particularly, to multi-carrier wired, wireless, and optical digital transmission systems.

The Data Over Cable Service Interface Specification (DOCSIS), version 3.1 (DOCSIS 3.1, or D3.1) is one of many known communications standards. DOCSIS 3.1 has changed the nature of information delivery across cable plants in fundamental ways, as well as the hybrid fiber coaxial (HFC) networks that implement DOCSIS. In recent HFC developments, the downstream channel no longer employs a one-size-fits-all modulation scheme, and instead has begun to optimize the modulation and forward error correction based on actual plant conditions at individual devices. This more customized approach allows, on the same channel, devices that receive an exceptionally "clean" signal to utilize more efficient high-order-modulation, but devices that receive a degraded signal to utilize more robust modulation.

However, the newly increased capability in the downstream channel has created increased complexity to optimize performance of the network conditions, particularly with regard to (i) the design of orthogonal frequency-division multiplexing (OFDM) profiles that are transmitted on the downstream channel, and (ii) the selection of appropriate modulation orders for a particular profile.

BRIEF SUMMARY

In an embodiment, a method is provided for optimizing a set of profiles for a downstream transmission over a channel to a population of user devices. The downstream transmission includes a plurality of active subcarriers. The method includes steps of receiving channel measurement data from each user device of the population for each of the plurality of subcarriers, calculating, from the received channel measurement data, a maximum bit-loading value for each user device per active subcarrier, grouping individual ones of the user devices into a plurality of clusters based on a proximity of the maximum bit-loading values of a first user device within a particular cluster to the maximum bit-loading values of a second user device within the particular cluster, assigning each individual user device within the particular cluster to a single cluster profile. A plurality of single cluster profiles for the plurality of clusters forms a set of cluster profiles. The method further includes steps of determining a channel capacity ratio for the set of cluster profiles, and combining, based on the determined channel capacity ratios, at least two single profiles of the set of cluster profiles into a coalesced profile pair.

In an embodiment, a downstream transmission system is provided for transmitting a plurality of active subcarriers over a channel. The system includes a cable modem termination system configured to define a plurality of downstream profiles. Each of the plurality of downstream profiles includes a particular modulation order. The system further includes a plurality of cable modems in operable communication with the cable modem termination system, and a profile management unit configured to receive channel measurement data from each of the cable modems and select an optimized set of profiles from the plurality of downstream profiles based on the received channel measurement data.

In an embodiment, a non-transitory computer-readable storage medium is provided. The storage medium has computer-executable instructions embodied thereon. When executed by one or more processors, the computer-executable instructions cause the one or more processors to receive channel measurement data from a plurality of cable modems in operable communication with a cable modem termination system, cluster the received channel information into a plurality of subgroups of the plurality of cable modems, assign modulation profiles to each subgroup cluster, coalesce the assigned modulation profiles from at least two subgroup clusters into a single optimal coalesced profile applicable to all cable modems within the at least two subgroup clusters.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
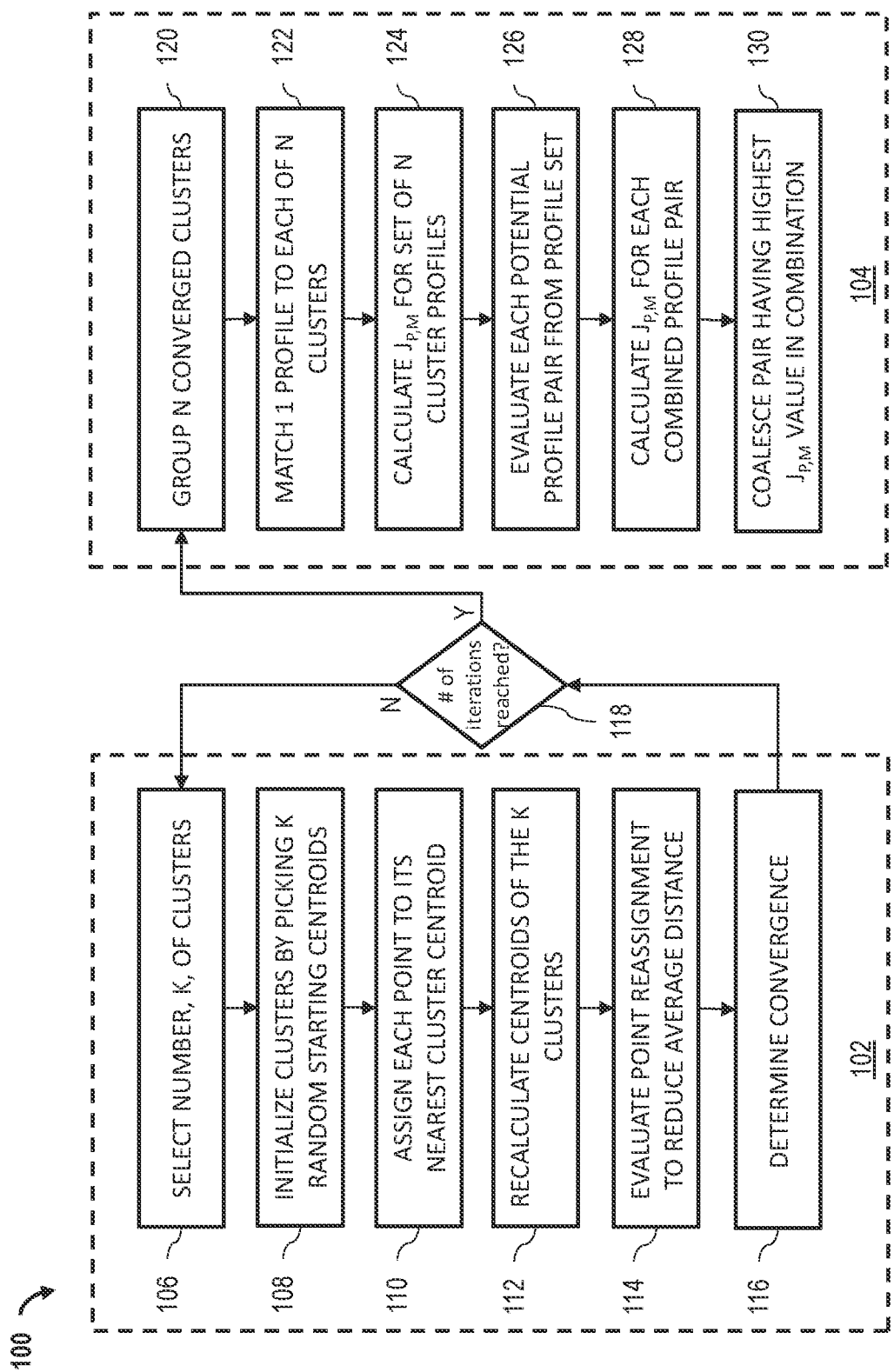
FIG. 1 is a flow chart diagram of an exemplary profile optimization process.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

In an exemplary embodiment, systems and methods are provided to optimize modulation profiles for individual end user devices, such as cable modems (CMs), or sets of CMs, and also to optimize grouping of CMs to select optimum modulation profiles thereof. DOCSIS 3.1 OFDM profiles include a wide range of modulation choices that maybe implemented to fine-tune a CM's transmission to achieve the best possible performance over given network conditions. The present embodiments therefore provide techniques to realize a well-designed and optimized set of modulation profiles. Systems and methods according to these techniques thereby advantageously allow a downstream channel to operate with a lower SNR margin, which in turn allows a particular channel to operate at an overall higher throughput.

The following embodiments describe novel systems and methods for designing OFDM profiles implemented with DOCSIS, and for selecting choosing the appropriate modulation orders for a particular profile. According to the present embodiments, a cable plant or transmission system may more efficiently and accurately determine which profile is appropriate for a particular CM, as well as what is the optimal set of profiles to utilize across an OFDM channel for a given set of CMs. the present techniques further define and objective function that may be used to calculate the gain in system capacity resulting from the use of multiple profiles, as well as advantageous approaches for maximizing this objective function for a population of CMs. In an exemplary embodiment, one such approach is described in detail further below, and sometimes referred to as a "K-means Coalescation Algorithm" (KCA). As described herein, the KCA provide significantly reliable results for determining the channel capacity/channel capacity ratio, and with low computational complexity.

The present embodiments advantageously utilize the range of modulation choices available in DOCSIS 3.1 to dynamically fine-tune transmissions to achieve optimal performance for given network conditions. The embodiments described herein further manage the optimization of settings across a population of devices utilizing downstream profiles. A given downstream profile defines the modulation order (i.e., bit loading) on each of a plurality of subcarriers (e.g., 3840 or 7680) across the particular OFDM channel. The present embodiments therefore advantageously utilize the capability of DOCSIS 3.1 to define multiple downstream profiles, in order to optimize, or "tune," each profile to account for specific plant conditions that are being experienced by a particular set of CMs.

In an exemplary embodiment, a software application is provided to implement optimization logic that, when executed by one or more processors of a device or transmission system, accomplishes the processes and subprocesses described further below. In some embodiments, the software application is stored and executed within a cable modem termination system (CMTS). In other embodiments, the application is external to the CMTS. When executed, the logic of the software application advantageously enables efficient utilization of profiles across channels and CMs. In some embodiments, the application is implemented by an operator, and allows uniform operation of algorithms across different CMTS platforms. As used further herein, the phrase "Profile Management Application" (PMA) refers to a software application, or a suite of software applications, installed on one or more processors, that is configured to execute any or all of the processes, subprocesses, methods, and/or algorithms described herein. Except where specifically described to the contrary, any portion of this functionality may be executed individually, separately, or in a different order from the other functionalities described herein.

The following embodiments are further described with respect to data elements utilized by the PMA, key information utilized by the PMA to make particular determinations, calculations, or decisions (e.g., channel configuration, profile test results, signal-to-noise ratio (SNR)/modulation error rate (MER) data for each CM, etc.), particular algorithms implemented by the PMA, and the overall structure of the PMA itself. The following embodiments further illustrate how the PMA selects an appropriate modulation order, or orders, for a profile, and how the PMA calculates which profile is appropriate/optimal for a CM, and/or how the PMA calculates the optimal set of profiles to use across the network.

DOCSIS Downstream OFDM Channels

DOCSIS-configured CM typically supports two or more independently configurable OFDM channels, each occupying a spectrum of up to 192 MHz in the downstream. The maximum channel bandwidth of 192 MHz corresponds to 3841 subcarriers in 4K mode, and to 7681 subcarriers in 8K mode. A downstream OFDM signal typically includes data subcarriers, scattered pilots, continuous pilots, and PHY link channel (PLC) subcarriers. Thus, the spectrum encompassed (i.e., the active bandwidth of the channel) by a DOCSIS 3.1 downstream OFDM 192 MHz channel does not exceed 190 MHz. Accordingly, the number of contiguous active subcarriers in a downstream OFDM channel does not exceed 3800 for 4K fast Fourier transform (FFT), and does not exceed 7600 for 8K FFT. The two downstream channel types are summarized in Table 1.

TABLE 1

Downstream Channel Options

| Subcarrier Spacing | 25 kHz | 50 KHz |
|---|---|---|
| Symbol Period | 40 μs | 20 μs |
| FFT Size | 8192 | 4096 |
| Maximum Number of subcarriers | 7600 | 3800 |

In operation, the downstream OFDM channel bandwidth may vary from 24 MHz to 192 MHz. Bandwidths smaller than 192 MHz are achieved by zero-valuing the subcarriers prior to performing an inverse discrete Fourier transform (IDFT), that is, by adjusting the equivalent number of active subcarriers while maintaining the same subcarrier spacing of 25 kHz or 50 kHz, as described in the DOCSIS 3.1 PHY Specification.

Downstream Modulation Profiles

Each of the subcarriers in the downstream OFDM channel may be configured to use a different modulation order, thereby allowing the CMTS to optimize the downstream transmissions across the frequency band (e.g., 192 MHZ) of the channel. The specific choice of modulation order, selected for each subcarrier, is communicated to the CMs in the form of a modulation profile, which thus allows the CMs to interpret and demodulate the signal.

A typical DOCSIS modulation profile includes a vector of bit-loading values, that is, an integer value for each active subcarrier in the downstream channel. For modulation orders ranging from 16-QAM to 16384-QAM, the bit-loading values of the vector may then range from 4 to 14 (skipping 5). In practice though, it is expected that low bit-loading values (e.g., 7 or less) will be used infrequently since most plants support at least 256 QAM at present.

In an exemplary embodiment, the CMTS generates a "Profile A" for the CMs in a particular Service Group. Profile A then functions as the lowest common denominator profile, and may be successfully received by all CMs in the Service Group. The CMTS may then generate up to 15 additional modulation profiles, which may also be communicated to the Service Group. Each CM may then be assigned up to four modulation profiles, including Profile A (used for broadcast frames), an optimized profile for the CM's unicast traffic, and possibly two additional profiles that may be used for multicast traffic. In practice, since the number of CMs in a Service Group is expected to be greater than 15 (in a majority of cases), it is expected that each profile will be used by a group of CMs that have similar channel characteristics.

This capability of the system, to optimize the downstream transmission for the channel characteristics of the CM population, allows the present embodiments to achieve a significant improvement in channel capacity, while simultaneously improving RF plant maintenance. Before the advent of DOCSIS 3.1, all traffic had been transmitted (i) using the lowest common denominator modulation (e.g., 64-QAM or 256-QAM), (ii) setting the downstream channel capacity to a fixed value, and (iii) setting an MER target for plant maintenance. Under DOCSIS, however, only a fraction of the downstream traffic will be carried using the Profile A and, since the CMTS is capable of automatically determining the modulation to use for that profile, there is no longer a single MER target. Furthermore, since CMs may now be assigned to modulation profiles that are optimized for their channel conditions, there is also no longer a fixed value for channel capacity.

Accordingly, the cleaner the channel is with respect to a particular CM, the more efficient the CM's traffic becomes, thereby raising the overall average efficiency, and hence, capacity, of the channel. The present systems and methods advantageously capitalize on this capability by providing the CMTS the ability to determine the channel conditions for the set of CMs in the Service Group and, from the channel condition information, further determine an optimal set (up to 16 in general) of modulation profiles.

In the embodiments discussed herein, the present PMA implements one or more of several DOCSIS methods to determine the channel conditions in the DOCSIS network. Examples of such methods include, without limitation, the OFDM Downstream Profile Test Request/Response mechanism (OPT-REQ/OPT-RSP MAC Management Message exchanges), and the Proactive Network Maintenance (PNM) toolset. The consideration of these particular methods are described below.

OFDM Downstream Profile Test

In a DOCSIS 3.1 network, the CMTS is able to utilize MAC Management Messages, such as OPT-REQ, to request that a CM test various aspects of an OFDM downstream channel. In this example, the OPT-REQ message, sent to a CM, may be utilized to verify the CM's ability to receive a specified downstream OFDM profile, and/or to query the CM's receive MER (RxMER) statistics.

When requested to report its MER measurements, the CM includes the RxMER per Subcarrier in a return OPT-RSP message transmitted to the, which may be encoded as a packed sequence of 8-bit values for N consecutive subcarriers (N≤7680), from lowest active subcarrier to the highest active subcarrier, including all the subcarriers in between. In an exemplary embodiment, although the resulting vector includes values for excluded subcarriers, the PMA is further configured to be able to ignore such included values based on the PMA's knowledge of excluded subcarriers.

Additionally, in some embodiments, a CM may, if desired, compare the RxMER per Subcarrier to a threshold value and report the result the comparison, calculate the number of subcarriers whose RxMER is a certain value below a target, and/or report the SNR margin of a candidate profile. That is, the present systems and methods utilize the ability of a CM to precompute some of the data before sending it back in a OPT-RSP message.

When requested to test a candidate profile, the CM may further report back the number of Codewords received during testing, such as Corrected Codeword Count (codewords that failed pre-decoding LDPC syndrome check and passed BCH decoding), and Uncorrectable Codeword Count (failed BCH decoding). The CM may still further report if the number of codeword failures was greater than a given threshold for the Candidate Profile.

Proactive Network Maintenance (PNM)

The CMTS and CM are also able to perform measurements and report network conditions as a part of supporting PNM functionality in the DOCSIS network. Such DOCSIS 3.1 downstream PNM measurements and data include, without limitation, Symbol Capture, Wideband Spectrum Analysis, Noise Power Ratio Measurement, Channel Estimate Coefficients, Constellation Display, Receive Modulation Error Ratio (RxMER) Per Subcarrier, FEC Statistics, Histogram, and Received Power. In this example, the DOCSIS 3.1 PNM capability assumes that a PNM server will initiate PNM tests and receive data output from the CM and/or from the converged cable access platform (CCAP). Some of the PNM data (e.g., RxMER numbers), are the same as that computed by a CM for the OPT-RSP message. All such PNM data may be uploaded to a PNM when requested by the PMA. Data obtained in this manner may be considered less timely comparison with data obtained using the OPT method.

The present embodiments primarily refer to the RxMER per Subcarrier data received from the CMs. The discussion of this particular received data is for simplicity of explanation purposes, and should not be construed as limiting. Other CM data, including the data discussed above, may also be utilized according to the principles described herein, and without departing from the scope of the several embodiments.

Profile Creation

For further simplicity of explanation, the following description assumes that a user's demand for bandwidth is independent of the modulation profile to which the user (i.e., the CM) is assigned. This assumption is reasonable with respect to the several embodiments, because the capability of a CM to use a particular profile is determined by the RF channel characteristics, which may be presumed to be independent of the user. The following description further assumes that in aggregate, the users assigned to each profile are generally equivalent in terms of bandwidth usage, and, as a result, each user is expected to place an equal load on the channel on average. This assumption is statistically borne out where all profiles contain a significant number of CMs. Nevertheless, the principles described herein are also useful in cases where CMs are not, in fact, substantially equivalent within a group. In such cases, the systems and methods described herein may further take into account considerations such as historical usage patterns, or weighting users based on the respective user service tiers. In light of the foregoing assumptions, the average channel capacity for a population of CMs, divided among a set of modulation profiles, may be derived.

For a population of user CMs, each user places data on the channel at a rate of b bits-per-second. Accordingly, each user profile will similarly place profile data on the channel at a rate of Nx*b bits-per-second, where Nx is the number of users assigned to profile x. This data rate thus equates to a symbol rate Sx namely, for the profile x, Sx=Nxb/Kx symbols-per-second, where Kx is the total efficiency of profile x (i.e., the sum of the bit-loading values of all of the subcarriers). The total channel symbol rate S is therefore the sum of the symbol rates Sx of all of the profiles. For purposes of this discussion, these calculations are simplified to disregard the forward error correction (FEC), as well as overhead incurred by the use of multiple profiles, such as additional NCP blocks, partial codewords. The total channel rate S may therefore be represented according to the following equations:

$$S = \sum_{\forall x} S_x \quad \text{(Eq. 1)}$$

$$S = b \cdot \sum_{\forall x} \frac{N_x}{K_x} \quad \text{(Eq. 2)}$$

Where b represents the per user bit rate for a fully loaded channel. Accordingly, since the symbol rate S of the channel is a parameter typically set by the operator (e.g., 50 ksym/s or 25 ksym/s), the per user bit rate b, for a fully loaded channel, may be derived according to the equation:

$$b = S \bigg/ \sum_{\forall x} \frac{N_x}{K_x} \quad \text{(Eq. 3)}$$

Total channel capacity C is calculated as: C=N*b, where N is the total number of users expressed according to the following equation:

$$C = NS \bigg/ \sum_{\forall x} \frac{N_x}{K_x} \quad \text{(Eq. 4)}$$

Or alternatively as:

$$C = S \bigg/ \sum_{\forall x} \frac{\Phi_x}{K_x} \quad \text{(Eq. 4)}$$

Where $\Phi_x=N_x/N$ is the fraction of users assigned to profile x. Accordingly, the harmonic mean (across all CMs) of each CM's single-user channel capacity is thus calculated.

As described above, DOCSIS 3.1 includes the notion of a lowest-common-denominator profile, referred to as "Profile A" that can be utilized by all CMs in the service group. In practice, it is mandatory that a Profile A be created (e.g., for broadcast data, at a minimum), to provide a useful metric J to assess the utility of a set of candidate profiles P, where $J_{P,A}$ is the ratio of the channel capacity $C_P$ using the set of candidate profiles P to the channel capacity $C_A$ only using profile A.

This ratio metric J is represented according to the following equations:

$$J_{P,A} = C_P / C_A \quad \text{(Eq. 5)}$$

$$J_{P,A} = \frac{S \Big/ \sum_{\forall x} \frac{\Phi_x}{K_x}}{S \Big/ \frac{1}{K_A}} \quad \text{(Eq. 6)}$$

Where $K_A$ is the efficiency of Profile A. These equations may be further reduced to:

$$J_{P,A} = \frac{1}{K_A \cdot \sum_{\forall x \in P} \frac{\Phi_x}{K_x}} \quad \text{(Eq. 7)}$$

Accordingly, the following embodiments advantageously accomplish the objective to create profiles that select a particular set of profiles P that maximizes the metric $J_{P,A}$ for the Service Group.

Channel Conditions for the Service Group

The population CMs in the Service Group is represented as a number N, and therefore the present PMA is configured to generate an N-by-N_sc matrix M describing the bit-loading capability of each CM, where N_sc represents the number of active subcarriers in the channel (e.g., up to 3800 for 4K FFT, and up to 7600 for 8K FFT). In an exemplary embodiment, the PMA generates this matrix by instructing the CMTS and/or CMs to perform channel measurements and report the MER per Subcarrier. From the reported MER information, the PMA is further configured to calculate the maximum bit-loading that the CM can reliably receive for each subcarrier. In some embodiments, the maximum bit-loading calculation further includes headroom to ensure reliable communication. In other embodiments, the maximum bit-loading calculation is aggressive, and relies on FEC to correct for MER deficiencies. In at least one embodiment, alternating subcarriers are assigned alternating bit-loading values, in order to target a CM that reports an MER that is halfway between the MER required for each of the two bit-loading values, and then also relies on FEC to further enable reliable communication.

From these PMA calculations, a "maximum-bit-loading" vector may be determined for each CM.

Calculating Profile A and $\Phi x$

For a given matrix M, Profile A may be determined from the column-wise minimum of matrix M (min (M)). Values $\Phi x$ are determined by comparing the rows of matrix M to the matrix of profiles P as follows.

In an exemplary embodiment, the PMA evaluates the suitability of a particular profile for a CM by comparing the maximum-bit-loading vector for the CM to the bit-loading vector of the profile P, and then determining that the CM vector is greater than the profile P vector for all subcarriers. In some embodiments, the relevant algorithm of the PMA accommodates the CM having some deficiencies in the number of subcarriers, based on a separate analysis of in FEC capability to correct for such deficiencies. In the exemplary embodiment, and for ease of further explanation, the PMA assigns each CM to the most efficient profile available, namely, the profile having the highest total bit-loading.

Using the matrix M, the ratio metric $J_{P,A}$ may be recast as the following objective function: $J_{P,M} = J_{P,A}$, where A=min (M) and $\Phi x$ is determined as described above. The PMA may therefore, under these considerations, address optimization as a determination of which profile P, for the matrix M, maximizes the value of the objective function ratio $J_{P,M}$. In the exemplary embodiment, because the matrix M is expected to vary over time (e.g., due to CMs being added to/removed from the Service Group, and/or due to fluctuations in channel conditions), the PMA periodically refreshes the measurements of matrix M, and updates the set of profiles P accordingly.

Profile Cost

As described above, for simplicity of description, the derivation of channel capacity C, and therefore also the objective function $J_{P,M}$, does not include additional overhead that would be incurred by introducing profiles to the profile set. The relevant "cost" of supporting each such additional profile results from events such as (i) the additional Next Codeword Pointer Data Message Blocks (necessary when the profile in use is changed within a symbol), (ii) the possibility of needing to pad a symbol with Zero Bit Loading, and (iii) the increased likelihood of using shortened FEC codewords.

Given that $J_{P,M}$ calculations described herein do not factor in the cost of supporting multiple profiles, it is demonstrable from the present embodiments that the optimal $J_{P,M}$ values increase as the number of profiles in P increases, at least until the number of profiles in P equals the number of unique vectors in matrix M (i.e., each CM having its own profile). Accordingly, the embodiments described herein are directed toward defining/selecting an optimal set of profiles from a target number of profiles, and therefore more closely reflect results from larger sets of such profiles. Nevertheless, utilizing the principles of the present embodiments, the profile cost may be additionally considered to determine the optimal number of profiles itself, as opposed to which set of a given number of profiles is optimal for assigning.

Multicast Profiles

As discussed above, some profiles may be used for multicast transmissions that need to be received by a known subset of CMs. In such cases, the CMTS may be configured to generate a multicast profile specifically to target the joiners of each multicast group. However, for a CMTS that only supports 16 total profiles, each of these multicast profiles will reduce the number of unicast profiles available, thereby reducing the total unicast channel capacity. For ease of explanation, the present embodiments are explained with respect to optimization of unicast profiles. A person of ordinary skill in the art though, after reading and comprehending the present disclosure, will understand that the present embodiments may be implemented to optimally define profiles in the presence of multicast groups.

Profile Optimization

In accordance with the several embodiments described herein, the PMA may implement one or more of the following methods, processes, subprocesses, and/or algorithms to select the optimal set of profiles.

Brute Force Searching

One such approach for selecting the optimal set of profiles is sometimes referred to as the "brute force search." The brute force search essentially includes steps of trying all combinations of all possible profiles, calculating the $J_{P,M}$ value for each such combination, and then selecting the profile combination exhibiting the highest $J_{P,M}$ value. In practice, however, the brute force approach requires vast amounts of processing and memory resources to execute. For example, a 192 MHz/4K FFT channel may include as many as 3800 subcarriers, with 10 choices of bit-loading for each subcarrier, resulting in at least $10^{3800}$ possible individual profiles, and approximately $(10_{15}{}^{3800})$ possible 16-profile sets (approximately $10^{57,000}$) to evaluate. This computational resource problem increases exponentially for higher order channels, such as an 8K mode channel (with 7600 subcarriers), or greater.

Nevertheless, in the brute force approach, the required search space may be somewhat reduced by eliminating from consideration those profiles that have a lower bit-loading than Profile A. For example, in the case where the geometric mean of the subcarrier bit-loading values of Profile A is 8 (e.g., corresponding to 256-QAM), the search space (in the 4K case) may be reduced from approximately $10^{57,000}$ to about $7^{57,000}$ or $10^{48,000}$. However, despite this significant reduction, the remaining computational requirements are still well beyond computationally feasibility for typical transmission systems.

The brute force computational requirements may yet be further reduced in consideration that it is unlikely that subcarrier bit-loading would need to vary by more than one modulation order between adjacent subcarriers. The number of possible profile sets may then be further simplified to approximately $10^{27,000}$. At the sacrifice of optimality, an additional simplification will assume that bit-loading changes only every 2 MHz (e.g., for 40 subcarriers), and then by only one modulation order at most for each such change. Using this simplification, the number of possible profile sets is reduced to approximately $10^{700}$, which is a dramatic reduction, but still computationally infeasible for the typical present-day transmission system.

In modern transmission systems, using the brute force approach, it would take approximately 11 million operations to calculate $J_{P,M}$ for a 16-profile set on a 4K FFT channel having 200 CMs, whereas present-day top- and processors (e.g., Core i7) would not be able to evaluate more than 20,000 profile sets per second, or approximately $10^{10}$ profile sets per day. Thus, even as processing power and speed continues to improve, so does the complexity and volume of transmission data.

Grouping CMs

The present systems and methods advantageously avoid the computational feasibility difficulties described above with several optimization approaches. In one such approach, an optimal single profile for a group of CMs may be more easily determined by first finding the minimum bit-loading capability for each subcarrier across the group of CMs. In other words, the PMA obtains the column-wise minimum of a subgroup's bit-loading capability matrix, $M_1$, where the rows of $M_1$ represent the bit-loading capability vectors of the CMs in the subgroup. Accordingly, the determination of the optimal set of profiles for a population of CMs may be alternatively considered as a determination of the optimal groupings of CMs. The optimal grouping determination may be performed as a single process, or in several stages.

Profile Coalescation Algorithm (PCA)

One approach utilized by the PMA for grouping CMs utilizes a profile coalescation algorithm (PCA). In an exemplary embodiment, the PCA begins with one profile per CM, where each CM's profile exactly matches its bit-loading capability vector, resulting in a set of N profiles. This set of N profiles is optimal for the population of CMs; however, unless N is less than 16, the number of profiles will be more than the typical CMTS can support. After the set of N profiles is determined, the PCA calculates $J_{P,M}$ for the set.

In the exemplary embodiment, in order to reduce the number of profiles of the set and, the PCA generates an optimal set of N−1 profiles by combining two of the N profiles into a single profile. In at least one embodiment, the optimal value is found by evaluating the effect of combining each of the $(_2{}^N)$ possible pairs of profiles (e.g., 19,900 pairs for a population of 200 CMs) and then, of these potential choices, coalescing the pair that provides the highest value of $J_{P,M}$.

In an exemplary embodiment, the PCA algorithm process can then be repeated to find the optimal set of N−2 profiles, then N−3, N−4, etc., until a desired number of profiles is achieved. By itself, the PCA algorithm they require a significant amount of processing ($O(N^2)$) for large values of N. However, this processing load may be reduced by implementing the PCA algorithm as a second stage of a two-stage process that pre-identifies clusters of CMs, and then beginning the PCA processing stage using one profile per cluster, instead of one profile per CM.

K-Means Coalescation Algorithm (KCA)

FIG. 1 is a flow chart diagram of an exemplary profile optimization process 100. In an exemplary embodiment, process 100 is a two-stage process including a clustering subprocess 102 as the first stage, and a coalescation subprocess 104 as the second stage. As described further herein, process 100 is also referred to as a key means qualification algorithm clustering subprocess 102 is also referred to as the "K-Means Coalescation Algorithm," or KCA, which may be implemented by the PMA. As also described further herein, clustering subprocess 102 is referred to as the "K-Means Algorithm," or KMA, and coalescation subprocess 104 is referred to as the PCA, as described above.

In operation, process 100 begins within clustering subprocess 102, at step 106. In step 106, process 100 selects a value for K, representing the number of clusters (e.g., clusters 202, FIG. 2). In step 108, process 100 initializes clusters by selecting K random starting centroids (e.g., centroids 204, FIG. 2). In an exemplary operation of step 108, process 100 selects the starting centroids by randomly choosing K data points (e.g., data points 206, FIG. 2) from a set of data points. In step 110, subprocess 100 assigns every data point to its nearest cluster. In an exemplary operation of step 110, each data point is assigned to the centroid to which it is nearest on a graphical plot of data points (e.g., plot 200, FIG. 2). In step 112, after all data points have been assigned, process 100 recalculates the centroids for each of the K clusters. In an exemplary embodiment, steps 110 and 112 are collectively considered to constitute a batch update phase of subprocess 102, and the batch update phase is repeated until the average distance between data points and their respective centroids no longer changes.

Once the batch update phase is completed (i.e., no further changes in data point-centroid average distance) process 100 proceeds to step 114. In step 114, subprocess 100 evaluates each data point and calculates whether reassigning the particular data point to a different cluster will reduce the average point-centroid distance. In an exemplary operation of step 114, process 100 recalculates the centroids according to the potential data point reassignment. In a further exemplary operation of step 114, process 100 reassignment a data point to the cluster that results in the smallest average point-centroid distance for that particular data point, and may further recalculate the centroids after the particular point is reassigned. In exemplary embodiment, process 100 repeats step 114 until there are no more data point reassignments, and then proceeds to step 116, in which process 100 determines that the KMA has converged. In an exemplary embodiment, steps 114 and 116 are collectively considered to constitute in an online update phase of subprocess 102, which is performed after completion of the batch update phase.

Clustering and K-Means Algorithm (KMA)

Figure 2:
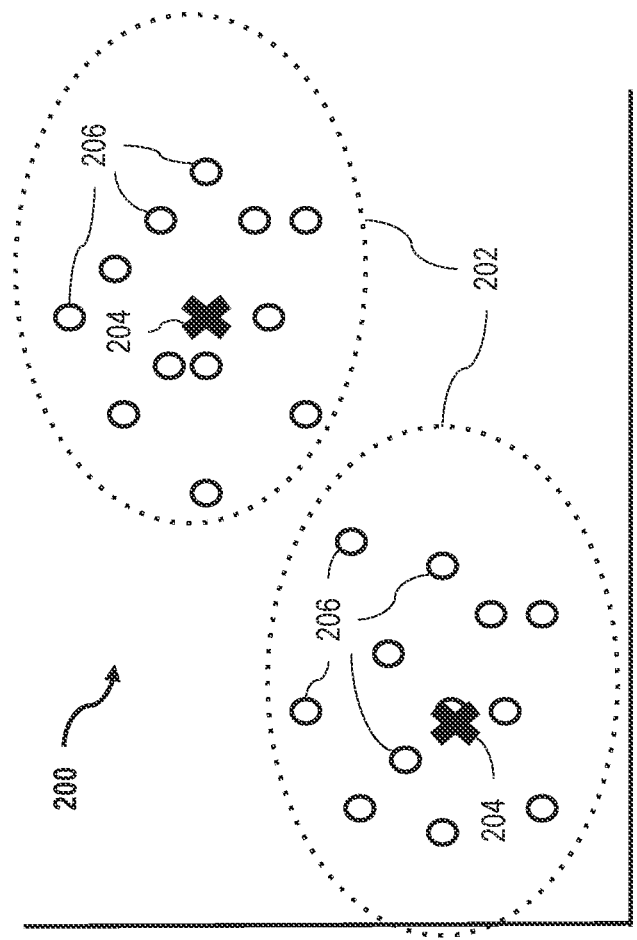
FIG. 2 is a graphical illustration of a plot of data point assignments according to the clustering subprocess depicted in FIG. 1.

FIG. 2 is a graphical illustration of a plot 200 of data point assignments according to clustering subprocess 102, FIG. 1. Plot 200 illustrates a graphical representation of a plurality of clusters 202 that each includes a centroid 204 and a plurality of data points 206. In the exemplary embodiment, plot 200 is obtained by implementing a clustering algorithm (e.g., subprocess 102, FIG. 1) for an unlabeled data set and identifying therefrom "clusters" of data/elements that are close to one another by some distance metric. In the exemplary embodiment, a KMA is used as the clustering algorithm.

In the example illustrated in FIG. 2, K=2, and the KMA separates the data points 206 into two clusters 202, with each data point 206 being assigned to the cluster 202 having a centroid 204 to which the particular data point 206 is nearest. In operation, the KMA takes the set of data points Joe six 206 and functions to identify the set of K clusters for which the average distance of each point 206 to a particular centroid 204 (i.e., the mean) of the associated cluster 202 is minimized. In the exemplary embodiment, the distance metric used by the KMA is an L1 or L2 norm, or the Mahalanobis distance. In some embodiments, the KMA implementation receives as input the number of clusters (K) into which the data set will be split, and then returns values for the set of K centroids, as well as a set of assignments of points to clusters. By itself, the KMA does not guarantee an optimal set of K clusters, and will in fact always converge to a local optimum. Nevertheless, the KMA is highly efficient, and may be repeated multiple times/iterations to select the best result therefrom.

In at least one embodiment, the KMA is utilized to identify groups of CMs that have similar bit-loading capability vectors since, in some instances, tightly clustered CMs may be considered good candidates to assign to a single profile. However, because the PMA is not, by itself, directed specifically toward the same objective of optimizing $J_{P,M}$, in the exemplary embodiment, the KCA does not automatically presume that the set of clusters 202 determined by the KMA is the optimal grouping of CMs with respect to the objective function $J_{P,M}$. Therefore, the KCA i.e., process 100, FIG. 1) advantageously utilizes the KMA as a pre-processing step (i.e., clustering subprocess 102) to the PCA (i.e., coalescation subprocess 104) in order to significantly reduce the number of starting profiles, and thereby also the computational complexity of the KCA.

Accordingly, referring back to FIG. 1, after process 100 determines, in step 116, that the KMA has converged, process 100 proceeds to step 118. Step 118 is a decision step. In step 118, process 100 determines whether subprocess 102 has been sufficiently repeated (e.g., subjected to a threshold number of predetermined iterations). If, in step 118, subprocess 102 has not been iterated the desired number of times, process 100 returns to step 106, and subprocess 102 is repeated. If though, in step 118, the sufficient iteration value has been reached, process 100 proceeds to step 120, which begins subprocess 104. The PCA of subprocess 104 therefore operates in a manner similar to the general PCA described above, except that, as a second stage of the two-stage KCA of process 100, the PCA of subprocess 104 advantageously begins with one profile for each cluster of CMs determined by subprocess 102, instead of a profile for each CM itself, thereby significantly reducing the processing requirements and computational complexity.

Referring back to step 120, subprocess 104 of process 100 begins by obtaining the group N of clusters determined according to the KMA of subprocess 102. Process 100 then proceeds to step 122, where the PCA determines, for each of the N clusters, a cluster profile that matches the bit-loading capability vector of that cluster, and thereby obtains a set of N cluster profiles therefrom. In step 124, process 100 calculates $J_{P,M}$ for the set of N cluster profiles. In step 126, process 100 evaluates the effect of combining each of the possible pairs of cluster profiles. In step 128, process 100 calculates $J_{P,M}$ for each pair of potentially-combined cluster profiles evaluated in step 126. In step 130, process 100 coalesces the combined cluster profile pair having the highest $J_{P,M}$ value from step 128, thereby reducing the set of N cluster profiles to a set of N−1 cluster profiles.

In an embodiment, to further reduce computational complexity, process 100 may repeat steps 126 through 130 in order to further reduce the set of N−1 cluster profiles to N−2, N−3, N−4, etc. cluster profiles as desired. According to the exemplary embodiment, clustering subprocess 102 thus functions as the first KMA pre-processing stage to the second-stage PCA of coalescation subprocess 104. In the exemplary operation, the KCA (i.e., process 100) is implemented as a combination of these two individual stages, but in the coordinated relationship described above. In one example of operation, the KMA/subprocess 102 is the run through a plurality of iterations (e.g., 30) with K=20, and a cluster assignment is selected that represents an optimal set of profiles, that is, as determined from the highest calculated values of $J_{P,M}$. The PCA/subprocess 104 then uses the set of profiles corresponding to this cluster assignment as the initial profile set for running the PCA. Through this advantageous integration of these two separate subprocesses, the present KCA achieves significant optimization improvements, and also significant reduction in computational complexity, then would be achieved from the mere combination of these two subprocesses operating independently, in a non-integrated manner.

Figure 3:
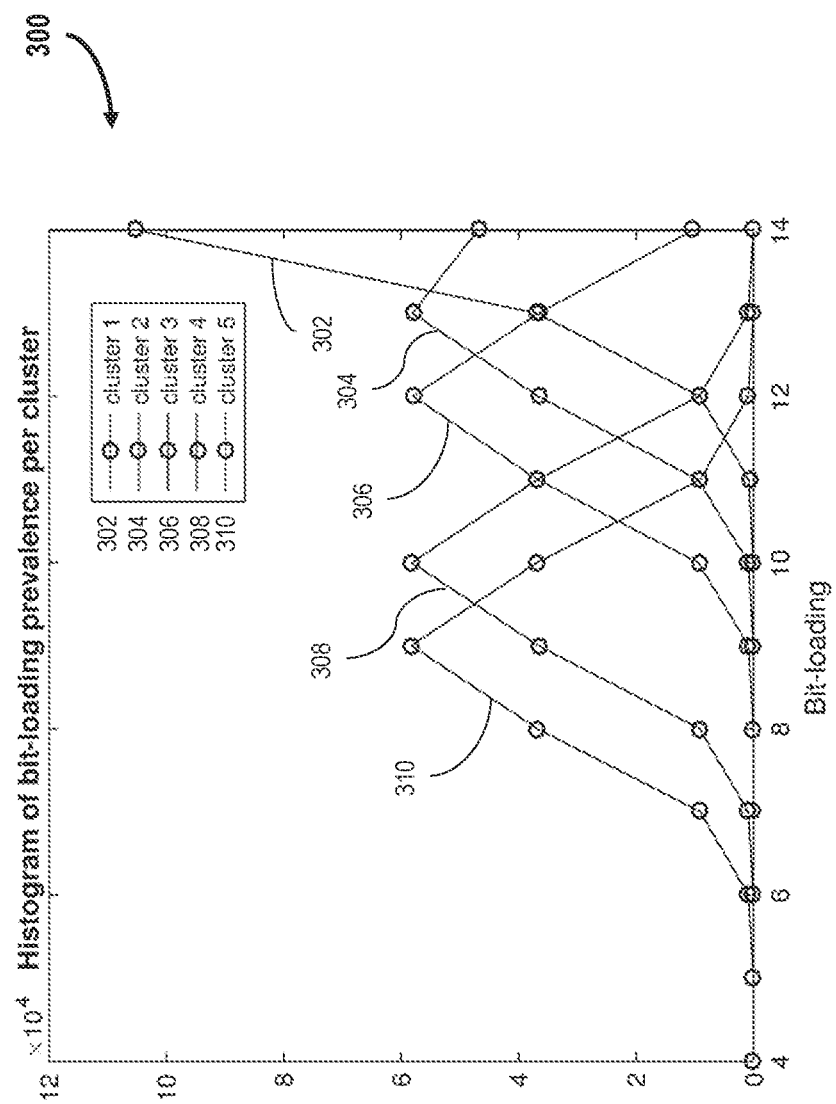
FIG. 3 is a graphical illustration of a histogram of bit-loading prevalence for a series of clusters according to the embodiment depicted in FIG. 2.

FIG. 3 is a graphical illustration of a histogram 300 of bit-loading prevalence for a series of clusters 202, FIG. 2. In an exemplary embodiment, histogram 300 is created from a synthetic CM data set of N=200 CMs, for a OFDM channel with N_sc=3800 subcarriers. In this example, an N-by-N_sc matrix M is generated to mathematically describe the bit-loading capabilities of each CM. The histogram results of the 200 synthetic CMs were divided into five clusters 302, 304, 306, 308, 310, with the CMs in each respective cluster having their bit-loading capability values chosen from a normal distribution with standard deviation of 1 and a mean unique to the cluster. The chosen bit-loading capability values were then quantized (i.e., rounded) to integers, and then limited to the range (4-14) of bit-loading values (x-axis). The mean values (i.e., the peak) for the five clusters were 14 (cluster 304), 13 (cluster 304), 12 (cluster 306), 10 (cluster 308), and 9 (cluster 310). The distribution of bit-loading values within each cluster are thus illustrated in the embodiment depicted in FIG. 3.

Figure 4:
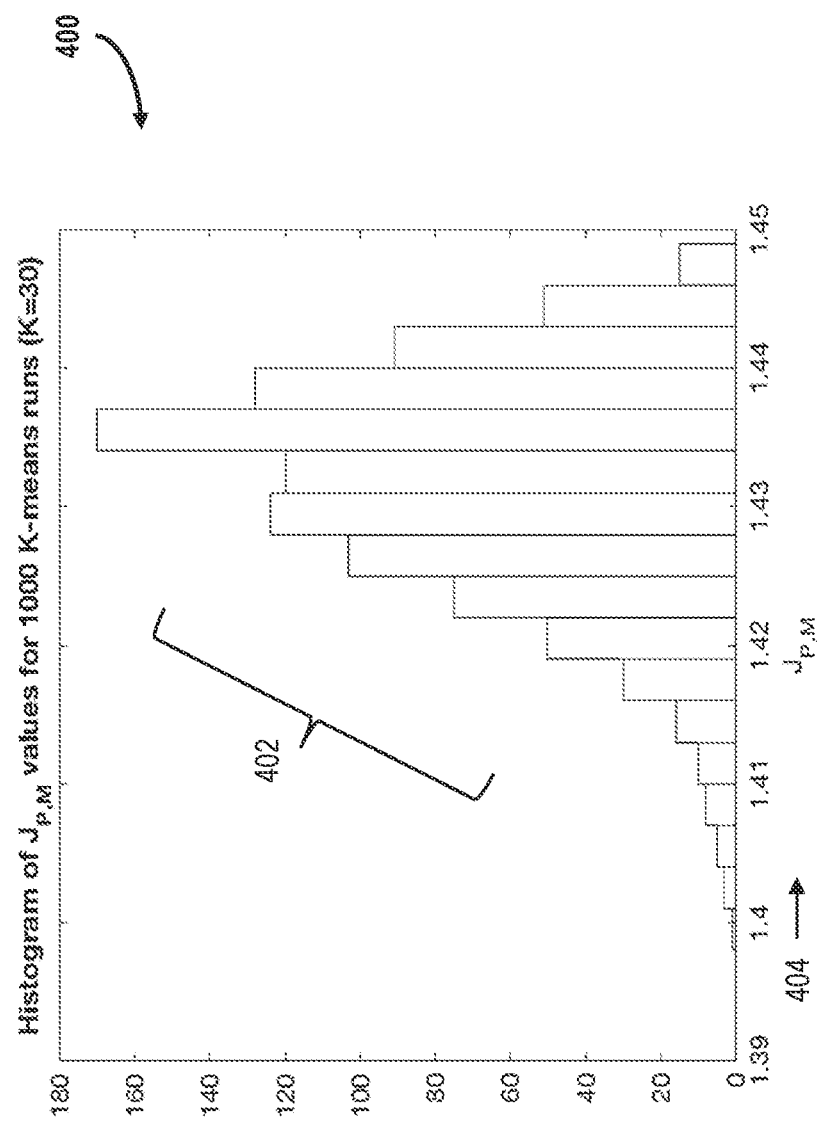
FIG. 4 is a graphical illustration of channel capacity ratio variability according to the clustering subprocess depicted in FIG. 1.

FIG. 4 is a graphical illustration of variability 402 of channel capacity ratio 404 (i.e., $J_{P,M}$, x-axis) calculated from the results of clustering subprocess 102, FIG. 1. In the exemplary embodiment shown in FIG. 4, the KMA begins with a randomized set of centroids (e.g. centroids 204, FIG. 2), and the resulting values will vary depending on particular starting conditions. In the exemplary embodiment, the KMA was run 1000 times (i.e., 1000 iterations of subprocess 102, FIG. 1), and the results thereof are plotted on histogram 400. The variability 402 in the results of running KMA only by itself indicates to the person of ordinary skill in the art that the KMA does not yield the same optimization results without further integration with the PCA.

Figure 5:
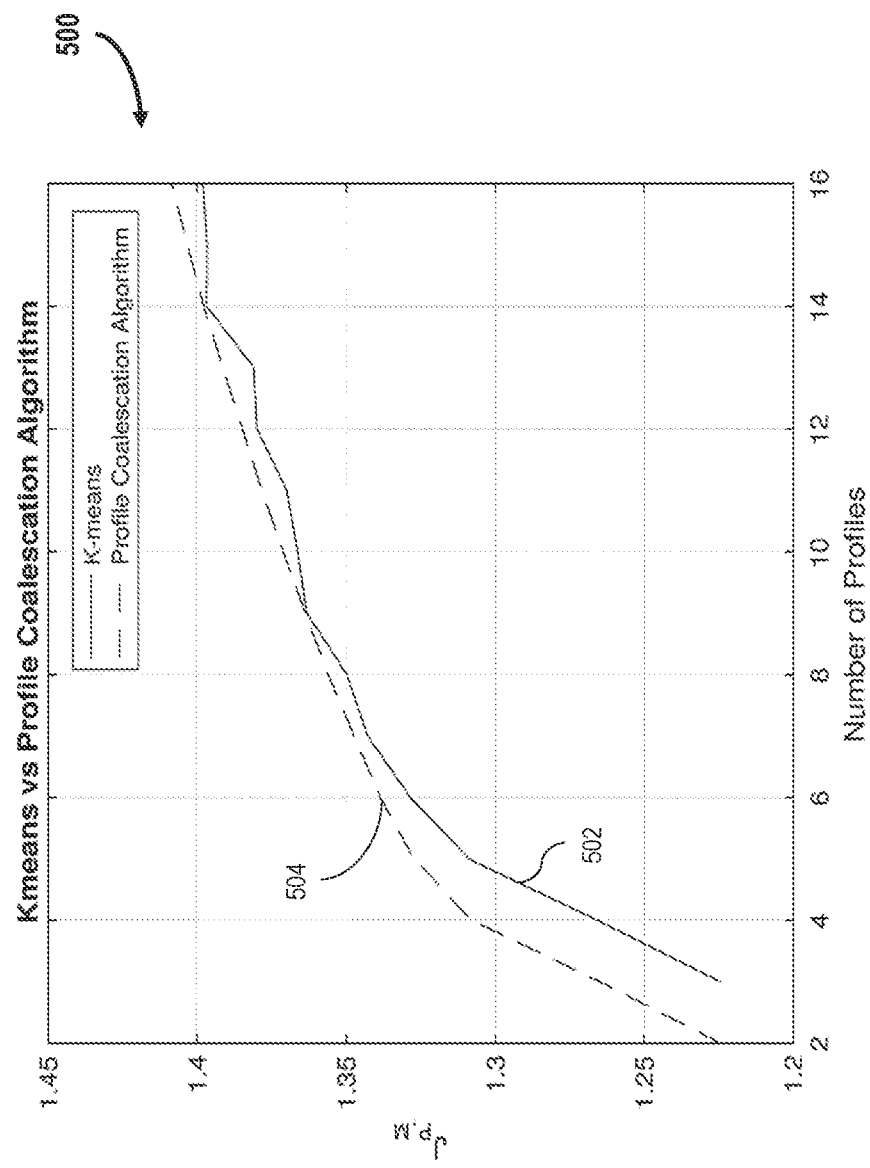
FIG. 5 is a graphical illustration plot comparing channel capacity ratio results between the subprocesses depicted in FIG. 1.

FIG. 5 is a graphical illustration plot 500 comparing channel capacity ratio $J_{P,M}$ results against the number of profiles for each of subprocesses 102, 104, FIG. 1, with both subprocesses operating independently to calculate values for $J_{P,M}$. As illustrated in FIG. 5, plot 500 includes linearized values 502 of KMA data collected using subprocess 102, linearized values 504 of PCA data collected using subprocess 104.

In an exemplary operation, for remaining profile generation algorithms, the KMA is run/iterated 30 times, and the best results are selected from these multiple iterations, as measured according to the highest values of $J_{P,M}$ from the 30 iterations. Accordingly, the two separate, linearized values for KMA results 502 and PCA results 504 are superimposed on one another, and thereby compared together. As illustrated, the PCA results 504 is shown to be more accurate, however, running the full PCA algorithm (i.e., subprocess 104, FIG. 1) on the modem population used in this experiment was very time-consuming, and therefore not extremely resource-efficient despite having achieved better results than using the KMA by itself.

Figure 6:
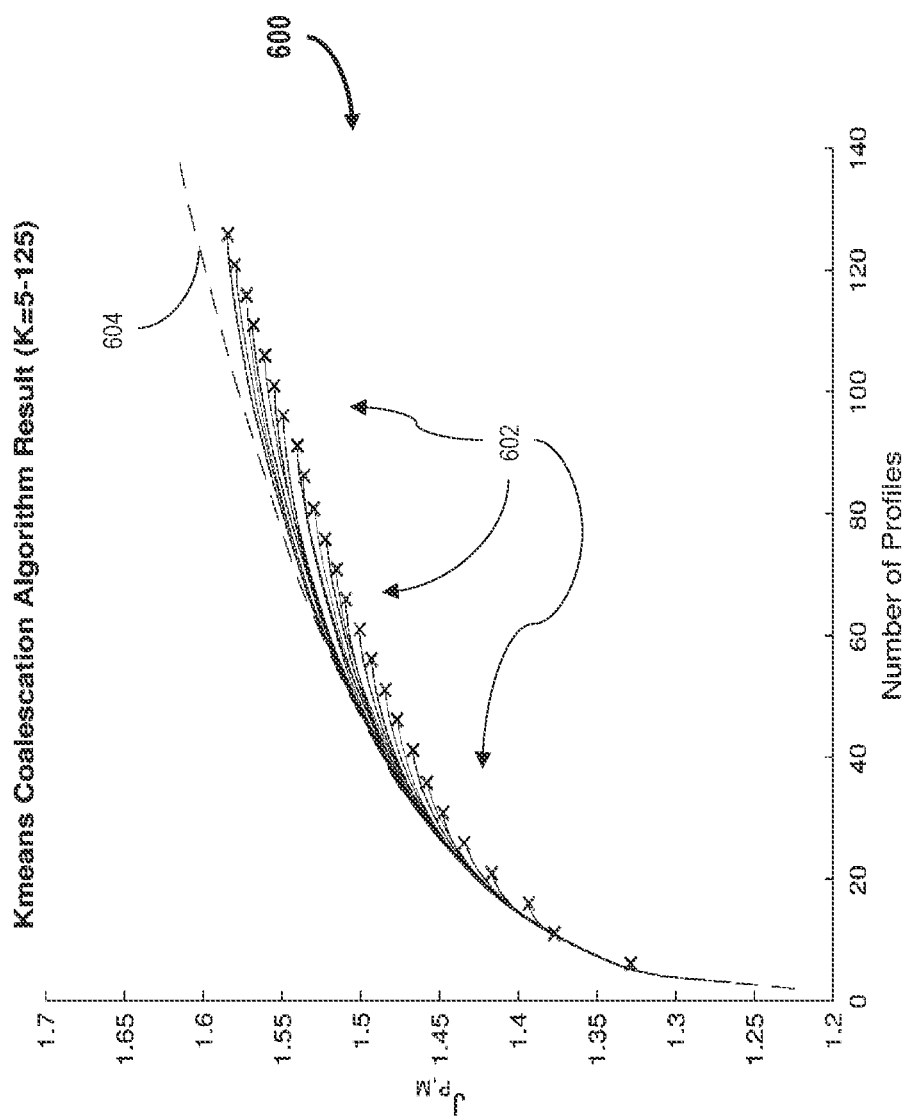
FIG. 6 is a graphical illustration plot of converging channel capacity ratio results according to the process depicted in FIG. 1.

FIG. 6 is a graphical illustration of a plot of converging channel capacity ratio results according to process 100, FIG. 1. In the exemplary embodiment, implementation of the full KCA process (i.e., process 100) yields results that cleanly converge to the PCA results of the particular CM population used as described above, as a test group. In this example, results of the KCA algorithm are illustrated using values of K ranging from 5 to 125, which are then compared against similar results 604 from the PCA (dashed line). In the illustration depicted in FIG. 6, particular $J_{P,M}$ values achieved by the KCA are marked with an individual to illustrate the $J_{P,M}$ value for a given number of profiles, and the solid line illustrates the progression of the coalescation algorithm.

Figure 7:
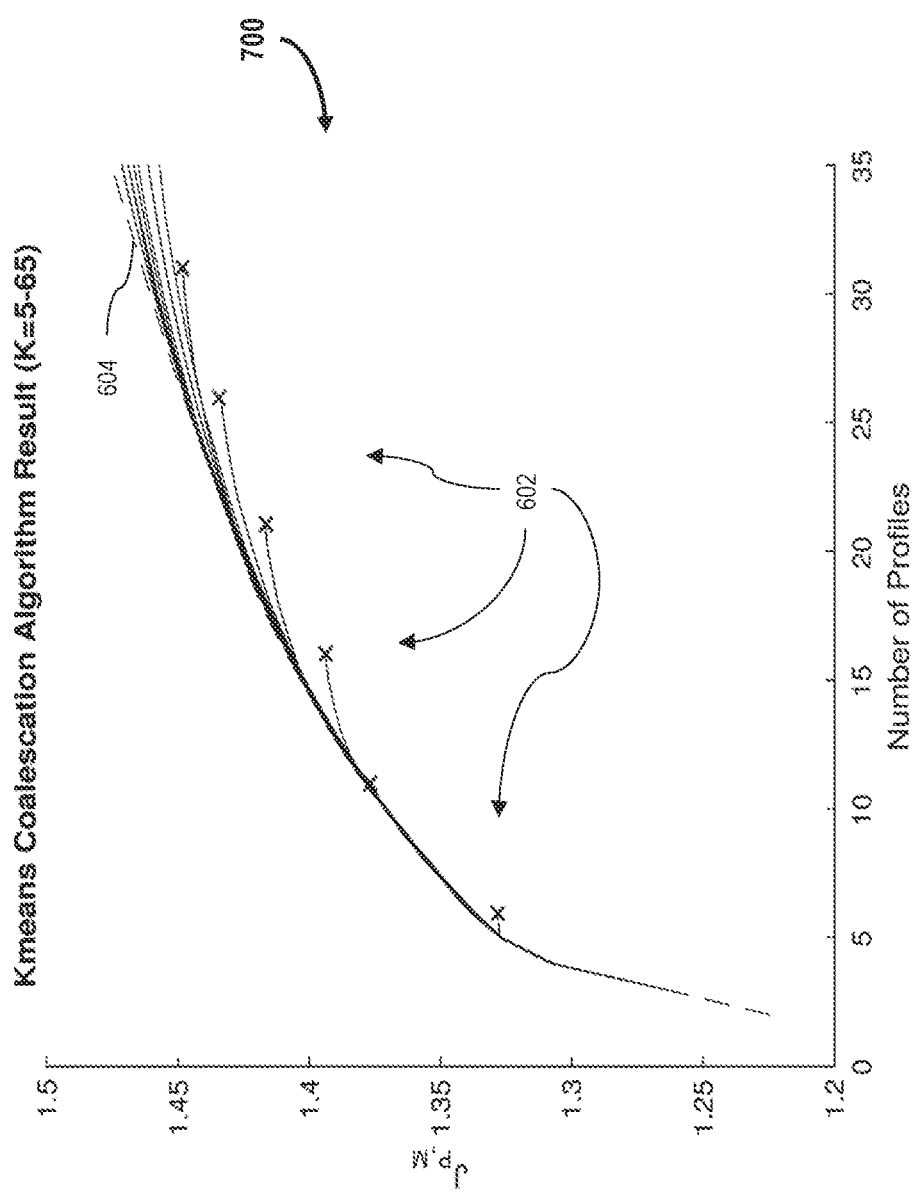
FIG. 7 is a close-up view of a region of the plot results depicted in FIG. 6.

FIG. 7 is a close-up view 700 of a region of the results depicted in plot 600 of FIG. 6. View 700 is similar to plot 600, except that view 700, interviews more closely, a region often considered to have the most interest, namely, where the number of profiles is less than or equal to 16. In this example, it can be seen that, by running the KCA with a K value of 20 (i.e., and thus 21 total starting profiles) the resulting $J_{P,M}$ values are substantially equivalent to the results 604 from the PCA (dashed line), and particularly with respect to substantially equivalent values from the PCA calculation within the 2-16 profile range, but with dramatically reduced computational complexity. This example, the benefit provided from utilization of 16 profiles may be quantifiably measured, namely, as 1.41, or also as 41% additional capacity transmission. Nevertheless, it should be noted that such results are strongly dependent on the CM population, and could be subsequently increased or decreased depending on how disparate the channel conditions might be across the CM population.

In the systems and methods described above, the embodiments described herein rely essentially on synthetic data sets. The present inventors contemplate that, by refining the KCA approach using real CM data, more practical and more robust CM data/profile optimization may be obtained.

As described above, DOCSIS 3.1 channel capacity is the harmonic mean of the individual CM single-user capacities. It is of significance to note that the harmonic mean is dominated by the minimum of the data. Accordingly, operators may expect that overall channel capacity using DOCSIS 3.1 is going to be strongly influenced by the worst performing of the CMs. Furthermore, with a profile management application in place, if the SNR for the worst performing CM degrades, the profiles can automatically adjust to maintain connectivity, eliminating any overt signal that the degradation has occurred. Unless the operator has systems in place to detect this condition, the operator may be disappointed by the performance of their DOCSIS 3.1 channels. Therefore, by monitoring the bit-loading of Profile A, and by identifying for remediation the CMs assigned to the Profile A, DOCSIS 3.1 plant maintenance may be further advantageously monitored and maintained.

The present inventors further envision advantageous uses for the present systems and methods including, but not limited to: (i) determining how often does a profile management application need to recalculate the profile definitions, (ii) determining how should a profile management application best handle sudden changes in the plant conditions, conditions which may make some profiles inappropriate for a set of CMs, and (iii) determining when it is appropriate to alert the operator to degraded CMs that are requiring an extremely inefficient profile. Such analyses, according to the present embodiments, will help an operator to develop a solid profile management application and help maintain an efficient and optimized plant.

The systems and methods described herein present a formulation to address some problems experienced with DOCSIS 3.1 downstream modulation profile optimization problem. The present embodiments thus demonstrate how the overall downstream capacity may be calculated as the harmonic mean of the individual CM. capacity can be calculated as the harmonic mean of the individual CM's single-user channel capacities (i.e., the capacity each CM would achieve if it were the only CM on the channel), and that the profile optimization problem is akin to a clustering problem, which may be solved according to similar processes and algorithms.

The KCA utilizes a KMA clustering algorithm to achieve improvements in both value and performance by successfully identifying optimal modulation profiles. In further embodiments, the KMA his integrated according to a novel PCA approach, which demonstrates improved performance over that of the KMA, but comes with significantly greater computational burden. Lastly, the KCA hybrid of the KMA and the PCA, May provide equivalent results compared to the PCA algorithm, but at significantly lower computational complexity.

Thus, a well-designed, optimized set of modulation profiles according to the present embodiments allows a downstream channel to operate with a lower SNR margin, potentially allowing a channel to operate at an overall higher throughput. Additionally, the optimized set of modulation profiles may further take into account troubled devices, by providing service even in situations where significant plant impairments exist.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A downstream transmission system for transmitting a plurality of active subcarriers over a channel, comprising:
    a cable modem termination system (CMTS) configured to define a plurality of downstream profiles, wherein each of the plurality of downstream profiles includes a particular modulation order;
    a plurality of modems in operable communication with the CMTS; and
    a profile management unit configured to:
        receive channel measurement data from each of the modems;
        select an optimized set of modulation profiles from the plurality of downstream profiles based on the received channel measurement data; and
        group the plurality of modems into two or more modem clusters, and wherein the optimized set of modulation profiles includes a single cluster profile for each of the two or more clusters.

2. The downstream transmission system of claim 1, wherein the profile management unit is disposed within the CMTS.

3. The downstream transmission system of claim 1, wherein the profile management unit is disposed externally to the CMTS.

4. The downstream transmission system of claim 1, wherein the profile management unit is further configured to assign the single cluster profile to each modem within a particular one of the two or more clusters.

5. The downstream transmission system of claim 4, wherein the profile management unit is further configured to:
    combine two of the single cluster profiles from two different respective clusters into a coalesced cluster profile; and
    assign the coalesced cluster profile to each modem within the two different respective clusters.

6. The downstream transmission system of claim 5, wherein the profile management unit is further configured to (i) evaluate each possible combination of single cluster profiles as a pair of two cluster profiles, and (ii) select an evaluated pair of two cluster profiles having the highest channel capacity metric value, within a set of evaluate cluster profile pairs, as a coalesced profile pair.

7. The downstream transmission system of claim 6, wherein the profile management unit is further configured to redetermine the channel capacity metric value and re-coalescing the cluster modulation profiles using a profile of the coalesced profile pair as a single cluster profile within the set of cluster profiles.

8. The downstream transmission system of claim 1, wherein the profile management unit is further configured to calculate, from the received channel measurement data, a maximum bit-loading value for each modem per active subcarrier.

9. The downstream transmission system of claim 8, wherein the profile management unit is further configured to group individual modems into a plurality of N clusters based on a proximity of the maximum bit-loading values of a first modem within a particular cluster to the maximum bit-loading values of a second modem within the particular cluster.

10. The downstream transmission system of claim 9, wherein the proximity is based on a mathematical distance metric including one or more of an L1 norm, an L2 norm, and a Mahalanobis distance.

11. The downstream transmission system of claim 9, wherein the proximity is based on a difference between the maximum bit-loading value and a mean of the particular cluster.

12. The downstream transmission system of claim 11, wherein the profile management unit is further configured to reassign a calculated bit-loading value from the particular cluster to a different cluster based on the proximity of the calculated bit-loading value to a mean of the different cluster being less than the proximity of the calculated bit-loading value to the mean of the particular cluster.

13. The downstream transmission system of claim 9, wherein the profile management unit is further configured to assign each individual modem within the particular cluster to a single cluster modulation profile, wherein a plurality of single cluster modulation profiles for the plurality of N clusters forms a set of N cluster modulation profiles.

14. The downstream transmission system of claim 13, wherein at least one single cluster modulation profile of the plurality of single cluster modulation profiles comprises a unicast transmission profile.

15. The downstream transmission system of claim 9, wherein the profile management unit is further configured to determine a channel capacity metric for each particular cluster of the set of N cluster modulation profiles.

16. The downstream transmission system of claim 15, wherein the profile management unit is further configured to coalesce, based on the determined channel capacity metrics, at least two single cluster modulation profiles of the set of N cluster modulation profiles into a coalesced profile pair.

17. The downstream transmission system of claim 9, wherein the profile management unit is further configured to transmit the plurality of active subcarriers to the plurality of modems using N−1 or fewer cluster modulation profiles.

18. The downstream transmission system of claim 1, wherein the downstream transmission is based on a DOCSIS format.

19. The downstream transmission system of claim 1, wherein the profile management unit is further configured to generate an $N \times N_{SC}$ matrix for the received channel measurement, where N represents a number of modems for the plurality of modems, and $N_{SC}$ represents a number of active subcarriers in the channel.

* * * * *